United States Patent
Noake et al.

(10) Patent No.: US 6,822,962 B1
(45) Date of Patent: Nov. 23, 2004

(54) VIRTUAL CONNECTION SWITCHING METHOD AND ATM SWITCH

(75) Inventors: Toshimichi Noake, Yokohama (JP); Toshiki Ichikawa, Yokohama (JP); Mitsumasa Mori, Yokohama (JP); Katsuya Ohwada, Yokohama (JP); Sadato Ando, Yokohama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 740 days.

(21) Appl. No.: 09/722,411

(22) Filed: Nov. 28, 2000

(30) Foreign Application Priority Data

Nov. 29, 1999 (JP) .......................................... P11-338612

(51) Int. Cl.[7] .................................................. H04L 5/14
(52) U.S. Cl. .................................... 370/395.2; 370/218
(58) Field of Search ................................ 370/217, 218, 370/219, 220, 221, 225, 228, 395.2, 395.3, 241.1, 236.1, 236.2, 242, 244, 248, 250

(56) References Cited

U.S. PATENT DOCUMENTS

| | | | | |
|---|---|---|---|---|
| 6,011,780 A | * | 1/2000 | Vaman et al. | 370/237 |
| 6,041,037 A | * | 3/2000 | Nishio et al. | 370/228 |
| 6,055,239 A | * | 4/2000 | Kato | 370/409 |
| 6,272,107 B1 | * | 8/2001 | Rochberger et al. | 370/216 |
| 6,311,288 B1 | * | 10/2001 | Heeren et al. | 714/4 |
| 6,314,105 B1 | * | 11/2001 | Luong | 370/395.2 |

FOREIGN PATENT DOCUMENTS

| | | | | |
|---|---|---|---|---|
| EP | 824292 A2 | * | 2/1998 | H04L/12/56 |
| EP | 961518 A2 | * | 12/1999 | H04Q/11/04 |
| JP | 9266480 | | 10/1997 | |
| JP | 1032575 | | 2/1998 | |

OTHER PUBLICATIONS

Hsing, D.–P.K. et al. "A Restoration Methodology Based on Pre–planned Source Routing in ATM Networks". IEEE International Conference on Communications. ICC 97 Montreal, 'Towards the Knowledge Millennium'. Jun. 8–12, 1997. vol. 1. pp. 277–282.*

Iwata, A. et al. "Alternative Routing Methods for PNNI Networks with Partially Disjoint Paths". IEEE Global Telecommunications Conference. Nov. 8–12, 1998, vol. 1. pp. 621–626.*

The ATM Forum Technical Committee "Private Network–Network Interface Specification Version 1.0 (PNNI 1.0)" af–pnni–0055.000 Mar. 1996.

* cited by examiner

*Primary Examiner*—John Pezzlo
*Assistant Examiner*—Donald L Mills
(74) *Attorney, Agent, or Firm*—Antonelli, Terry, Stout & Kraus, LLP (57) ABSTRACT

A communication network capable of establishing an SVC bypass route when a failure occurs in a PVC multiplexed line wherein each of ATM switches at both ends of a PVC stores the relations of SVC specifying information and the other party PVC information in association with each PVC in a management table. At the time of bypassing, one of the switches transmits a message including the other party PVC information to another ATM switch for each PVC to be bypassed and another ATM switch specifies a PVC to be switched on the basis of the received message and switches the PVC to an SVC specified by the corresponding SVC specifying information stored in the management table.

8 Claims, 8 Drawing Sheets

ROUTING TABLE 150

| ATM ADDRESS (CALLED PARTY NO.) | EGRESS SVC PHYSICAL LINE NO. | EGRESS SVC LOGICAL LINE NO. |
|---|---|---|
| | | | ~150-1
| | | | ~150-2
| | | |

VC MANAGEMENT TABLE 180

| CALL REFERENCE | TYPE OF VC | BYPASSING FLAG |
|---|---|---|
| | | | ~180-1
| | | | ~180-2
| | | |

VIRTUAL CONNECTION SWITCHING METHOD AND ATM SWITCH

BACKGROUND OF THE INVENTION

(1) Field of the Invention

The present invention relates to a VC (Virtual Connection) switching method in an ATM (Asynchronous Transfer Mode) network and an ATM switch. More particularly, the invention relates to a VC switching method and an ATM switch for switching a PVC (Permanent Virtual Connection) path to an SVC (Switched Virtual Connection) path as a bypass.

(2) Description of the Related Art

In recent years, a communication system called ATM communication applicable to both data communications and real-time communications of voice and the like is being practically used. As various applications dealing with multimedia are integrated in a communication network, in order to increase the reliability of the network, it is indispensable to provide a communication node having the function of bypassing a failed line when a line failure or a device failure occurs.

An example of means of switching a failed PVC to an SVC is soft PVPC or soft PVCC disclosed in The ATM Forum Technical Committee "Private Network-Network Interface Specification Version 1.0 (PNNI 1.0)" af-pnni-0055.000, March, 1996.

In the case of switching a PVC to an SVC by using the soft PVPC or soft PVCC, all nodes (ATM switches) positioning along an end-to-end path have to be provided with a PNNI (Private Network-Network Interface) protocol, and even in a steady communication state in which there is no bypassing operation, it is necessary to execute a complicated PNNI protocol process at each of the nodes to automatically recognize a network configuration. When a node existing between the ends does not have the PNNI or a transit node positioning between the nodes does not have the PNNI, the PVC cannot be bypassed by using the SVC.

An example of a known VC switching method of switching the PVC to the SVC is disclosed in Japanese Unexamined Patent Application No. 9-266480. In the method, an ATM switch which detects a failure in a PVC line stores the relations of an address of a neighboring switch, egress port number of the neighboring switch, and egress port number of itself into a neighboring node connecting information table for PVC switching on the basis of neighboring node connecting information obtained by a routing information collecting function related to a network control. When a link failure is detected in a line interface, the ATM switch obtains the address of a neighboring switch connected to a failed egress port by referring to the neighboring node connecting information for PVC switching, selects an optimum route to the neighboring switch by a network control processing unit, and transmits a call setup message via the optimum route.

The call setup message uses the neighboring switch address as a called party address and includes VPI/VCI indicative of a PVC on the failed link and a failed port number as calling party sub-address information elements. The neighboring switch specifies the egress port number of itself connected to the failed link by referring to the neighboring node connecting information for PVC switching on the basis of the calling party address (neighboring switch address) and the failed egress port number (neighboring switch egress port number) indicated by the calling party sub-address information elements in the call setup message. The neighboring switch determines the VPI/VCI for connection to the bypass route, notifies the VPI/VCI as a call reception message to the neighboring switch at the origination side and sends a connection acknowledge message.

On receipt of the call reception message and the connection acknowledge message, the neighboring switch on the origination side executes the process of switching the failed PVC to the SVC and then transmits a notification message indicative of completion of the connection to a neighboring switch. On receipt of the notification message, the neighboring switch executes the process of switching the failed PVC to the SVC.

Another known example of switching the PVC to the SVC is disclosed in Japanese Unexamined Patent Application No. 10-32575. The publication discloses a VC switching method of, in a manner similar to the above conventional technique, forming a network topology information table by using the PNNI protocol or the like in advance, retrieving a bypass route to an ATM switch at the other party from the table when a VC switching request is generated, and transmitting a connection request message including bypass information.

The connection request message includes an ATM address of the ATM switch at the other party as a called party address. In the message, a line ID of the ATM switch at the other party and the VPI/VCI of the VC to be bypassed which are obtained from the network topology information table are set as bypass information. In this case, the ATM switch at the other party which receives the connection request message determines that the received request relates to a request for bypassing a specific VC according to the bypass information and information prepared in the ATM switch, and switches the specific VC to an alternative SVC.

SUMMARY OF THE INVENTION

Since the two conventional techniques are made on condition that each of the ATM switches has the routing information collecting function such as the PNNI to determine a bypass, they have problems which are to be solved by the present invention.

A VC switching system of preparing a standby PVC for each of PVCs which operate in a normal route and switching the PVC to the corresponding standby PVC when a failure occurs in the normal route can be considered. The switching method using the PVC as a bypass has, however, a problem such that the utilization factor of communication resources in a standby PVC line deteriorates at the time of operating the normal route.

In place of preparing the PVC as a bypass, which vainly occupies the communication resources, in order to set an SVC as necessary, a function of promptly selecting a route of an SVC as a bypass and calling the SVC when a failure in the PVC is detected or when a bypassing command is received has to be provided.

In the case where an SVC for use in a conventional call and an alternative SVC coexist in the same node, it is necessary to prepare a function of discriminating a call setup message for bypassing control from conventional call setup messages when they are received from another node and specifying a PVC to be bypassed if a plurality of PVCs exist in the node. Further, when the cause of the bypassing is resolved, a function of specifying the relation between a PVC to be recovered and an alternative SVC to switch back the VC is necessary.

An object of the invention is to solve the problems and to provide a VC switching method capable of promptly switching a PVC to an SVC.

Another object of the invention is to provide an ATM switch capable of promptly switching a PVC to an SVC without requiring a network configuration recognizing function such as the PNNI protocol.

Further another object of the invention is to provide an ATM switch capable of promptly switching the SVC back to the original PVC when the cause of bypassing is resolved.

In order to achieve the objects, according to the invention, there is provided a method of switching a virtual connection between first and second ATM switches in an ATM network, comprising the steps of: storing into each of said first and second ATM switches, (a) bypassing control information in association with PVC management information specifying a PVC between said ATM switches, the bypassing control information indicating relations of SVC specifying information for specifying an SVC to be used as a bypass of the PVC, address information of an ATM switch at the other party, and the other party PVC information for specifying the PVC in said the other party ATM switch; (b) transmitting a bypassing call setup message from said first ATM switch to a line specified by the SVC specifying information at the time of an operation of switching the PVC to the SVC, the bypassing call setup message including said the other party PVC information and using the address information of the ATM switch at the other party as a called party address; (c) switching the PVC to the SVC by said first ATM switch on the basis of the PVC management information and said the other party SVC information when a response is received from said second ATM switch; and (d) referring to the bypassing control information corresponding to said the other party PVC information included in the bypassing call setup message by said second ATM switch, thereby to switch a PVC specified by said the other party PVC information to an SVC specified by the SVC specifying information includes as a part of the referred bypassing control information.

When a plurality of PVCs are multiplexed on a physical or logical line, the PVC management information and bypassing control information is prepared for each of the PVCs. When a bypassing factor occurs in a specific physical or logical line, an ATM switch which is using the physical or logical line generates a bypassing call setup message for each of the PVCs multiplexed on the physical or logical line, and each of the plurality of PVCs is switched to an SVC.

An ATM switch according to the invention comprising: a memory for storing bypassing control information blocks in association with PVC management information blocks for each of PVCs of the ATM switch, each of said bypassing control information blocks indicating relations of SVC specifying information for specifying an SVC to be used as a bypass of the PVC, address information of an ATM switch at the other party in the PVC, and the other party PVC information for specifying the PVC in said the other party ATM switch; first means for transmitting when a bypassing factor from a specific PVC to an SVC occurs, a bypassing call setup message to a line specified by the SVC specifying information corresponding to the specific PVC and switching the PVC to the SVC on the basis of the PVC specifying information and said the other party SVC information, the bypassing call setup message including said the other party PVC information and using the address information of the ATM switch at the other party as a called party address; and second means for referring when a bypassing call setup message is received from another ATM switch, to the bypassing control information block corresponding to the PVC specifying information included in said referred bypassing call setup message and switching a PVC specified by said the other party PVC information to an SVC specified by the SVC specifying information included in the bypassing control information block.

The other objects and features of the invention will become apparent from the following description of the embodiments with reference to the accompanying drawings.

DESCRIPTION OF THE PREFERRED EMBODIMENTS

Embodiments of the invention will be described hereinbelow with reference to the drawings.

Figure 1:
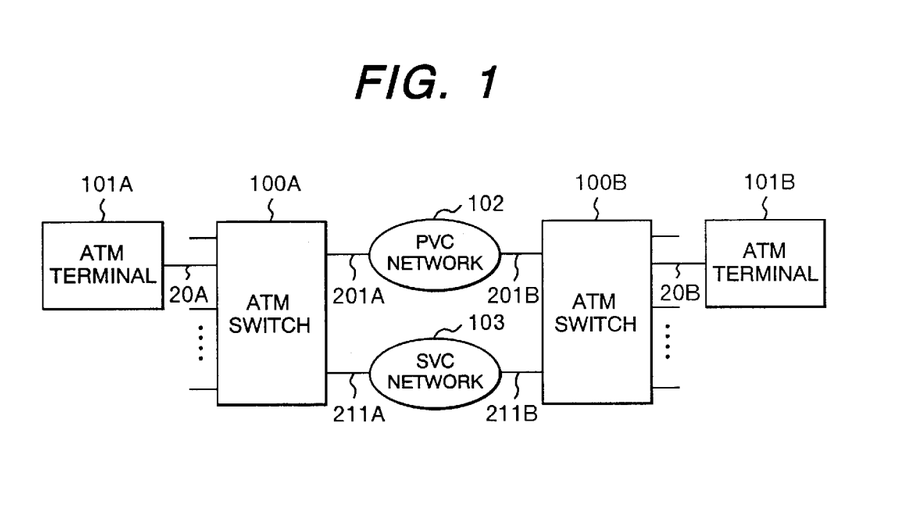
FIG. 1 is a diagram schematically showing the configuration of an ATM communication network to which the invention is applied.

FIG. 1 is a diagram schematically showing the configuration of a communication network to which the invention is applied.

In the diagram, reference numerals 100 (100A and 100B) denote ATM switches (nodes), 101 (101A and 101B) indicate ATM terminals connected to the ATM switches 100, and 102 via interconnections 20A, 20B, and 103 denote a PVC network and an SVC network, respectively, each for connecting the ATM switches 100.

In the following description, it is assumed that communication between the ATM terminals 101A and 101B is carried out through a PVC route including the ATM switch 100A, a line 201A, the PVC network 102, and a line 201B in normal times, and when a failure occurs in the PVC route, the PVC route is switched to an SVC route including a line 211A, the SVC network 103, and a line 211B. An operation of switching (bypassing) the PVC route to the SVC route will be described on assumption that the ATM switch 100A is on an originating side and the ATM switch 100B is on a terminating side.

Figure 2:
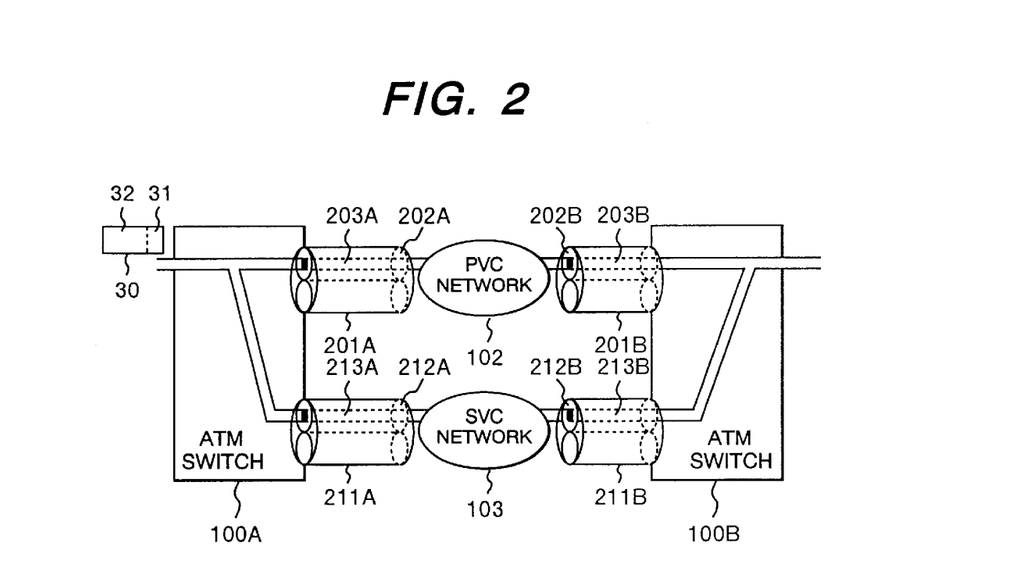
FIG. 2 is a diagram for explaining the details of a PVC route and an SVC route formed between two ATM switches.

FIG. 2 shows the details of the PVC route and the SVC route which are formed between the ATM switches 100A and 100B. Each of the ATM switches has, as will be described hereinlater with reference to FIG. 3, a plurality of pairs each having an input line and an output line as connection lines to other switches in the PVC network 102 and the SVC network 103. In FIG. 2, to simplify the diagram, the input/output lines are expressed by a single physical line.

Reference numeral 201A denotes the PVC physical line connected one of a plurality of input/output ports of the originating ATM switch 10A, and 211A denotes the SVC physical line connected to another one of the input/output ports of the ATM switch 10A. A plurality of logical lines are multiplexed on each of the physical lines and, further, a plurality of PVCs or SVCs are multiplexed on each of the logical lines. Reference numeral 202A indicates a logical line formed on the PVC physical line 201A, 203A indicates a PVC formed on the logical line 201A, 212A denotes a logical line formed on the SVC physical line 211A, and 213A denotes an SVC formed on the logical line 211A.

Similarly, reference numeral 201B denotes the PVC physical line connected to one of a plurality of input/output ports of the terminating ATM switch 100B, 202B indicates a logical line formed on the physical line 201B, 203B indicates a PVC formed on the logical line 201B, 211B expresses the SVC physical line connected to another one of the input/output ports of the terminating ATM switch 100B, 212B expresses a logical line formed on the SVC physical line 211B, and 213B denotes an SVC formed on the logical line 211B.

Reference numeral 30 denotes an ATM cell comprised of a cell header 31 and a data portion 32. The ATM cell 30 is transmitted/received between the ATM terminals 101A and 10B via the PVC 203A, PVC network 102, and PVC 203B in normal times. The ATM cell 30 is transmitted/received between the ATM terminals 101A and 101B via the SVC 213A, SCV network 103, and SVC 213B at the time of bypassing.

Figure 3:
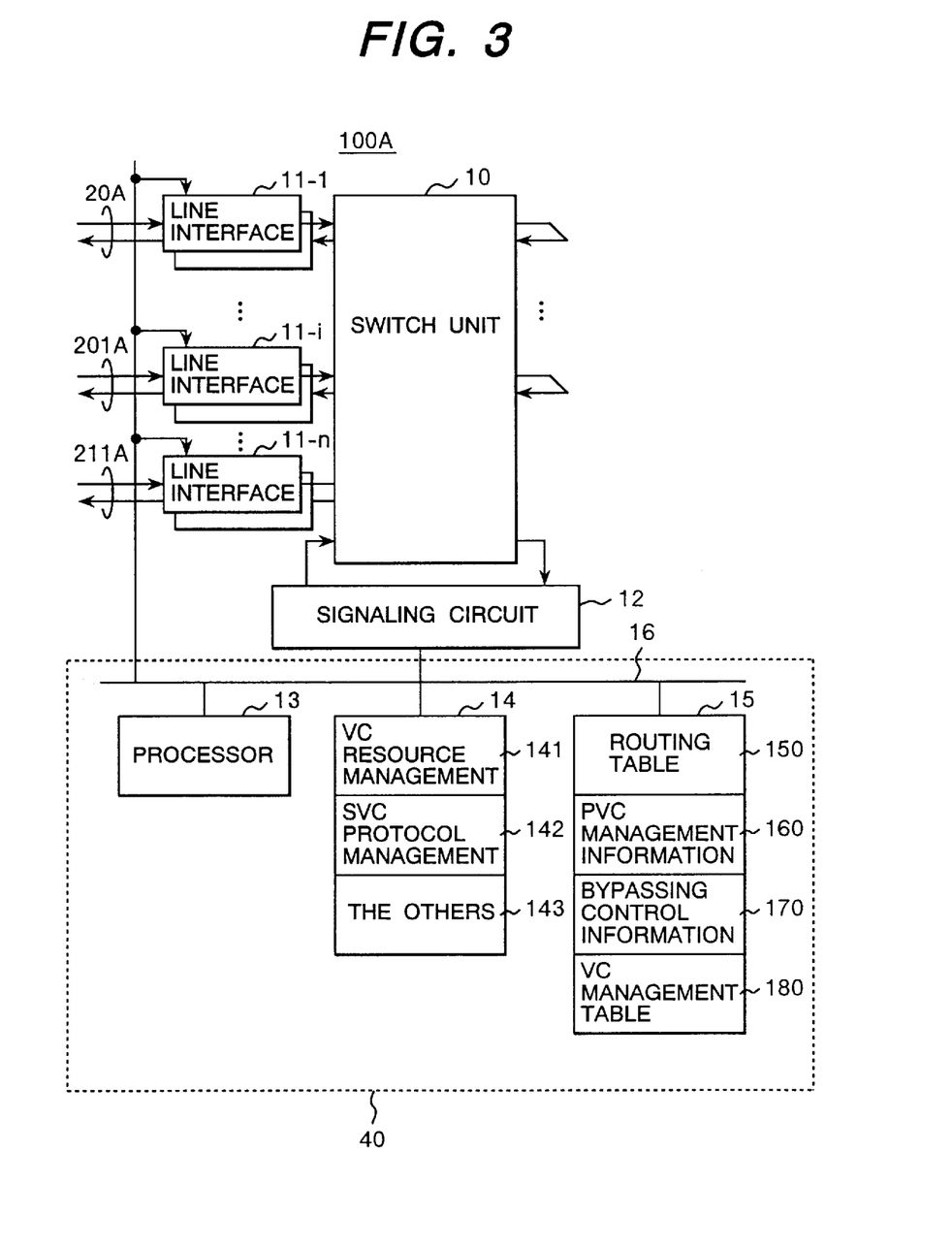
FIG. 3 is a diagram showing an example of the configuration of an ATM switch 100.

FIG. 3 shows the configuration of the ATM switch 10A.

The ATM switch 100 has: a plurality of pairs of line interfaces 11 (11-1 to 11-n) each pair connected to an input line and an output line; a switch unit 10 for transferring ATM cells 30 supplied from each of the input line interfaces to an output line interface specified by the VPI/VCI in the cell header 31; a signaling circuit 12 for making an original message from control cells, each of which includes control information such as a call setup message in the data portion 32, received from the switch unit 10, converting a control message transmitted from the ATM switch (call controller 40) into ATM cells, and supplying these ATM cells to the switch unit 10; and a call controller 40 connected to the signaling circuit 12.

The call controller 40 has a processor 13, a memory 14 in which various programs executed by the processor 13 are stored, a data memory 15, and a bus 16. It is able to rewrite the header conversion table provided in each of the line interfaces 11 by an output of the processor 13.

The line interfaces 11-1 are connected via input/output lines 20A to the ATM terminal 101A. The line interfaces 11-i are connected via the input/output lines 201A to a neighboring node (ATM switch) in the PVC network 102. The line interfaces 11-n are connected to a neighboring node in the SVC network 103 via the input/output lines 211A.

In the embodiment, in the memory 14, a VC resource management routine 141 and an SVC protocol management routine 142, which will be described hereinlater, and other routines 143 necessary for the functions of the switch are prepared. In the data memory 15, a routing table 150, a PVC management information memory area 160, a bypassing control information memory area 170, and a VC management table 180, which will be described hereinlater, are defined. The other ATM switch 100B has a configuration similar to that of the ATM switch 100A.

Figure 4A:
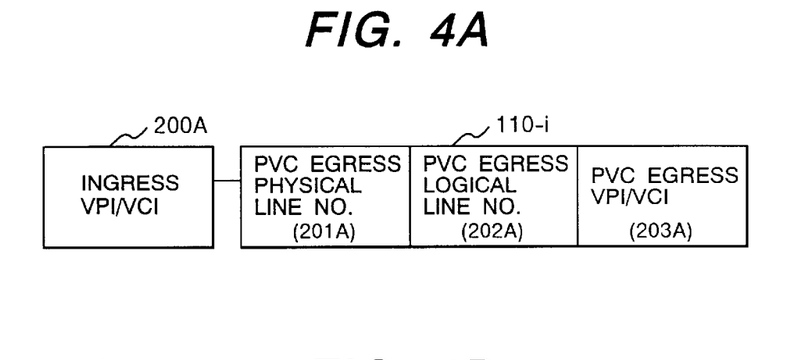
FIG. 4A is a diagram for explaining an entry for a PVC to be set in a header conversion table of a line interface in the ATM switch 100.

FIG. 4A shows an example of a table entry to be set in the header conversion table provided in the input line interface 11-1.

In the header conversion table, a plurality of entries are set in correspondence with the VPI/VCI. In order to relay the cell 30 transmitted from the ATM terminal 101A to the PVC network 102, in correspondence with the VPI/VCI (ingress VPI/VCI) 200A indicated by the header of the cell 30, an entry 110-i constructed by a line number (PVC egress physical line No.) indicative of the physical line 201A, a line number (PVC egress logical line No.) indicative of the logical line 202A, and VPI/VCI (PVC egress VPI/VCI) indicative of the PVC 203A, which have been described with reference to FIG. 2, is set in advance.

On receipt of the cell 30 from the line 20A, the line interface 11-1 reads out the entry 110-i out from the header conversion table by using the ingress VPI/VCI 200A extracted from the cell header 31 as a key, converts the VPI/VCI in the cell header 31 into a PVC egress VPI/VCI 203A, adds an internal header including the PVC egress physical line No. 201A and the PVC egress logical line No. 202A to the cell header, and supplies the resultant cell 30 to the switch unit 10.

The switch unit 10 performs a switching process on the cells supplied from each of the input line interfaces 11 in accordance with the internal header. Consequently, the input cell from the ATM terminal 101A is transferred to the output line interface 11-i where the internal header is removed, and a resultant cell is transmitted to the output line 201A.

Figure 4B:
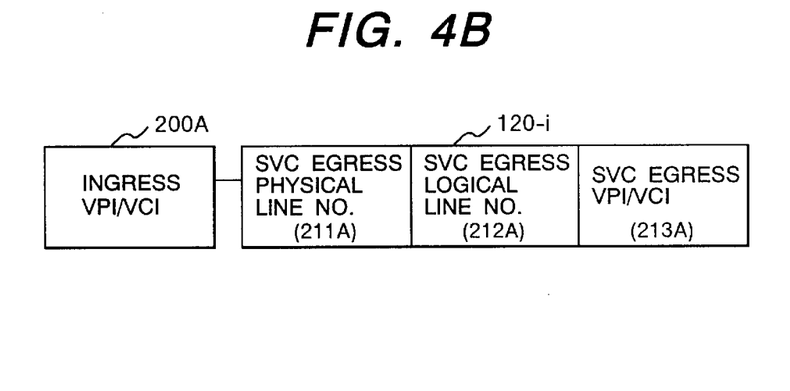
FIG. 4B is a diagram for explaining an entry for an SVC to be set in the header conversion table.

When a failure occurs in any of the line 201A and the PVC routes 202A to 202B in the PVC network 102, the entry 110-i corresponding to the ingress VPI/VCI 200A is replaced by an entry 120-i shown in FIG. 4B in the header conversion table of the input line interface 11-1. The entry 120-i is constructed by a line number (SVC egress physical line No.) indicative of the physical line 211A, a line number (SVC egress logical line No.) indicative of the logical line 212A, and VPI/VCI (SVC egress VPI/VCI) indicative of the SVC 213A, which have been described with reference to FIG. 2. By the replacement of the entry, the route of the input cell from the ATM terminal 101A can be switched to the output line interface 11-n.

Figure 5:
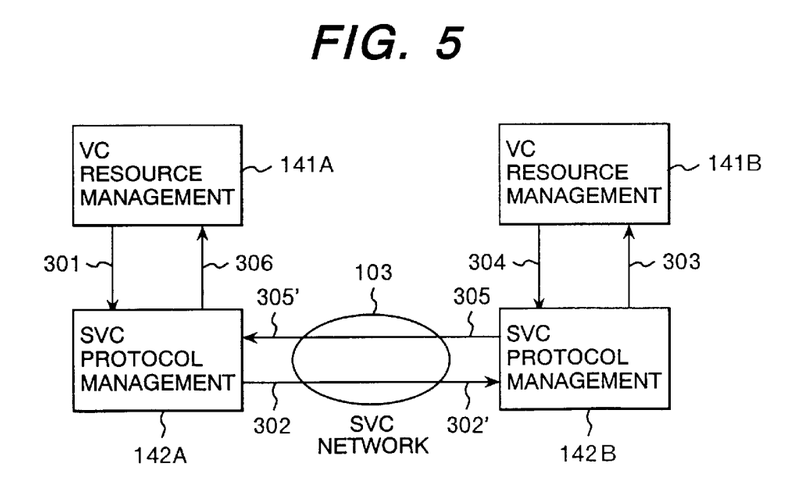
FIG. 5 is a diagram schematically showing a procedure of switching a PVC to an SVC in the invention.

FIG. 5 is a diagram schematically showing a procedure of switching the PVC to the SVC according to the invention. In the diagram, reference numerals 141A and 142A denote a VC resource management (routine) and an SVC protocol management (routine), respectively, provided in the originating ATM switch 10A, and 141B and 142B denote a VC resource management and an SVC protocol management, respectively, provided in the terminating ATM switch 100B.

For example, when a failure in the line 201A or the PVC network 102 is detected by the line interface 11-i of the originating ATM switch 100A or when an instruction (bypassing instruction) of switching a path is given from the outside, the call controller 40 issues a call request 301 in which a PVC to be bypassed is designated from the VC resource management 141A to the SVC protocol management 142A.

The SVC protocol management 142A which has received the call request 301 generates a call setup message 302 for bypassing control on the basis of PVC management information and bypassing control information which will be described hereinlater with reference to FIG. 6. The call setup message 302 includes PVC specifying information of the terminating ATM switch by using a specific ATM address (telephone number) allocated to the originating ATM switch 100A as a calling party No. and using a specific ATM address (telephone number) preliminarily allocated to the terminating ATM switch 100B as a called party No. The call setup message 302 is transmitted as control ATM cells each including the VPI/VCI for a control (signaling) cell in the cell header to the SVC network 103 and is received by the call controller 40 in the terminating ATM switch 100B.

On receipt of the call setup message 302', the call controller 40 in the terminating ATM switch 100B determines the type of the call setup by the SVC protocol management 142B. When the received message is a bypassing call setup message, an incoming call request 303 is issued from the SVC protocol management 142B to the VC resource management 141B.

The VC resource management 141B specifies the line interface to be VC switched on the basis of the PVC management information 160 and the bypassing control information 170 read out from the memory 15, rewrites the header conversion table and, after that, returns an acceptance response 304 to the SVC protocol management 142B. When the acceptance response 304 is received, the SVC protocol management 142B issues a connection message 305 to the originating ATM switch 100A.

The connection message 305 is transmitted as control ATM cells to the SVC network 103 and is received by the call controller 40 in the originating ATM switch 100A. When the connection message 305' is received, a response 306 is issued from the SVC protocol management 142A to the VC resource management 141A. The VC resource management 141A which has received the response 306 switches the VC by rewriting the header conversion table in the line interface 11 as an ingress side of the failed PVC.

Figure 6:
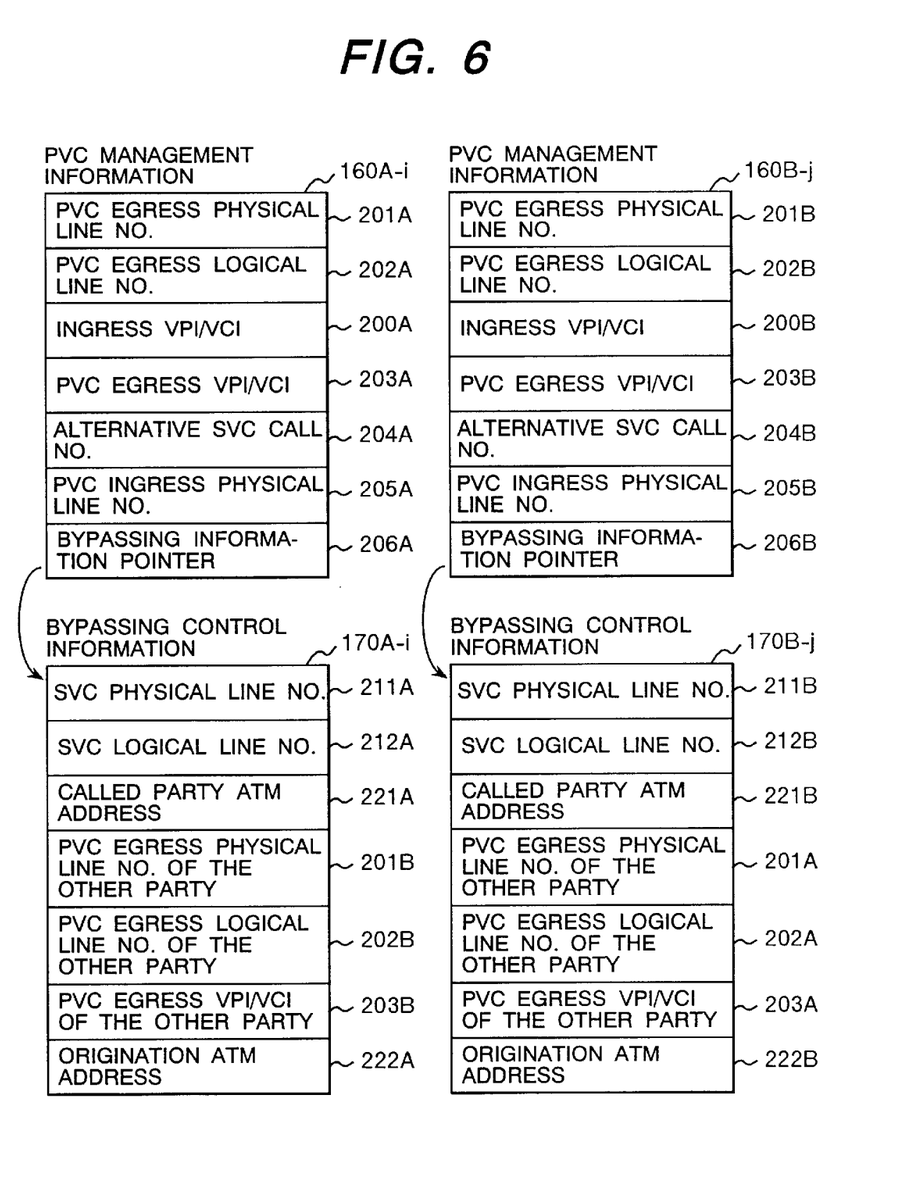
FIG. 6 is a diagram showing an example of PVC management information blocks 160 (160A-i, 160B-j) and bypassing control information blocks 170 (170A-i, 170B-j) stored in an originating ATM switch and a terminating ATM switch.

FIG. 6 shows the contents of a PVC management information block 160A-i and a bypassing control information block 170A-i stored in the memory areas 160 and 170 in the originating ATM switch 100A and the contents of a PVC management information block 160B-j and a bypassing control information block 170B-j stored in the terminating ATM switch 100B.

Each of the ATM switches 100A and 100B has a PVC management information block and a bypassing control information block for each PVC multiplexed on the lines 201A and 201B. The PVC management information block and the bypassing control information block regarding the PVC 203A in the originating ATM switch 100A and the corresponding PVC 203B in the terminating ATM switch 100B which are shown in FIG. 2 will be described here.

The PVC management information block 160A-i in the originating ATM switch 100A has the PVC egress physical line No. 201A, PVC egress logical line No. 202A, ingress VPI/VCI 200A, PVC egress VPI/VCI 203A, alternative SVC call No. 204A, PVC ingress physical line No. 205A, and bypassing information pointer 206A. The bypassing information pointer 206A indicates the head address of the bypassing control information block 170A-i paired with the PVC management information block 160A-i.

Similarly, the PVC management information block 160B-j of the terminating ATM switch 100B has the PVC egress physical line No. 201B, PVC egress logical line No. 202B, ingress VPI/VCI 200B, PVC egress VPI/VCI 203B, alternative SVC call No. 204B, PVC ingress physical line No. 205B, and bypassing information pointer 206B. The bypassing information pointer 206B indicates the head address of the bypassing control information block 170B-j paired with the PVC management information block 160B-j.

The reference numerals 201A to 203A and 201B to 203B denote the physical lines, logical lines and PVCs of the same reference numerals in FIG. 2. In the alternative SVC call Nos. 204A and 204B in the PVC management information, significant data is set when the PVC is switched to the SVC and invalid data is set while the PVC is used.

In the originating ATM switch 10A, the bypassing control information block 170A-i linked to the PVC management information block 160A-i includes SVC physical line No. 211A and SVC logical line No. 212A indicative of a destination switched from the PVC defined by the PVC management information block 160A-i, called party ATM address 221A indicative of a specific telephone number allocated to the ATM switch 100B as the other party of the PVC, PVC egress physical line No. 201B of the other party, PVC egress logical line No. 202B of the other party, and PVC egress VPI/VCI 203B of the other party indicative of a bypassed PVC in the terminating ATM switch 100B, and originating ATM address 222A indicative of a specific telephone number allocated to the originating ATM switch 100A.

Similarly, in the terminating ATM switch 100B, the bypassing control information block 170B-j prepared by being linked to the PVC management information block 160B-j includes SVC physical line No. 211B and SVC logical line No. 212B indicative of a destination switched from the PVC defined by the PVC management information block 160B-j, called party ATM address 221B indicative of a specific telephone number allocated to the ATM switch 100A, PVC egress physical line No. 201A of the other party, PVC egress logical line No. 202A of the other party, and PVC egress VPI/VCI 203A of the other party indicative of a bypassed PVC in the terminating ATM switch 100A, and originating ATM address 222B indicative of a specific telephone number allocated to the originating ATM switch 100B.

As obviously understood by comparing the bypassing control information block 170A-i with the PVC management information block 160B-j and comparing the bypassing control information block 170B-j with the PVC management information block 160A-i, each of the ATM switches positioning at both ends of the PVC stores, in the bypassing control information block linked to its PVC specifying information block, the alternative PVC specifying information which is held in the PVC management information block by the other switch.

Figure 7:
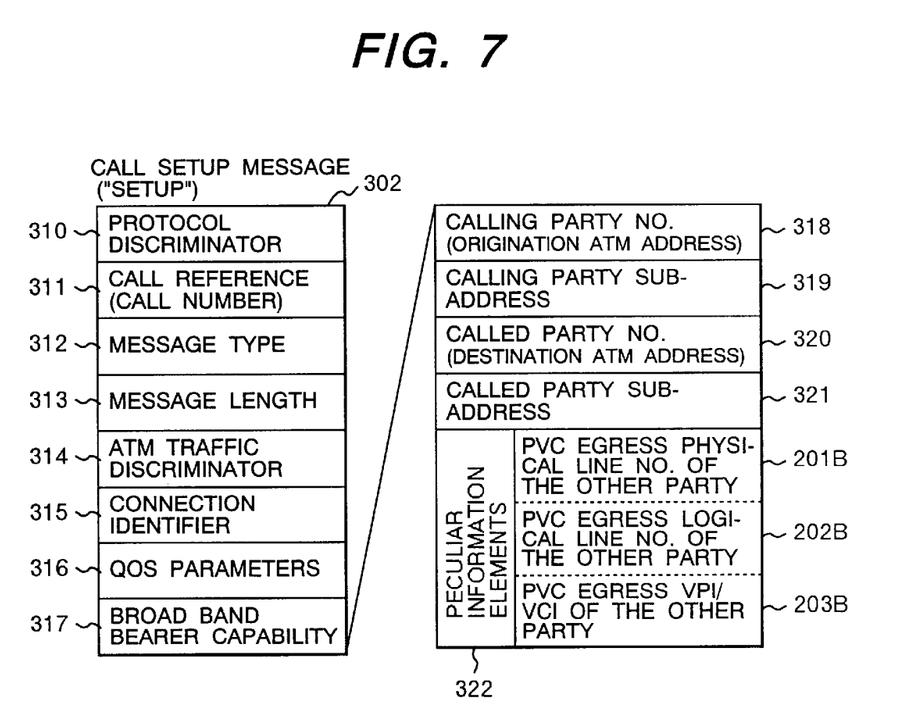
FIG. 7 is a diagram showing an example of the format of a call setup message 302 for bypassing.

FIG. 7 shows a format of the call setup message 302 for bypassing control transmitted from the ATM switch 100A to the ATM switch 100B via the SVC network 103.

The format of the call setup message 302 for bypassing control is in conformity with, for example, ITU-TQ.2931 and includes a protocol discriminator 310, a call reference (call number) 311, a message type 312, a message length 313, an ATM traffic discriminator 314, a connection identifier 315, QOS parameters 316, broad band bearer capability 317, calling party No. (origination ATM address) 318, a calling party sub-address 319, a called party No. (destination ATM address) 320, a called party sub-address 321, and peculiar information elements 322. As the peculiar information elements 322, the PVC egress physical line No. 201B, the PVC egress logical line No. 202B, and the PVC egress VPI/VCI 203B of the other party indicated by the bypassing control information block 170A-i are set.

Figure 8:
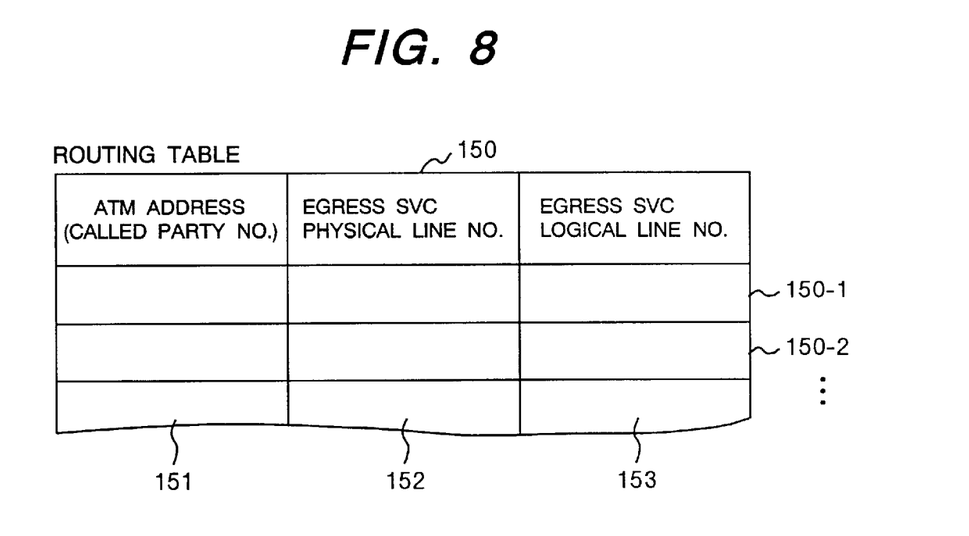
FIG. 8 is a diagram showing the configuration of a routing table 150 prepared in each of the originating and terminating ATM switches.

FIG. 8 shows the configuration of the routing table 150.

The routing table 150 is composed of a plurality of entries 150-1, 150-2, . . . each defining the relations of an ATM address 151 which is set as the called party No. 320 in a call setup message for normal call, an egress SVC physical line No. 152, and an egress SVC logical line No. 153. In each of the switches, on receipt of the call setup message, the routing table 150 is referred to on the basis of the called party No. 320 included in the received message, the egress SVC physical line No. 152 and the egress SVC logical line No. 153 corresponding to the called party No. are retrieved, and an output line to which the received message is transferred is specified.

In an embodiment of the invention, in order to discriminate whether the received call setup message is for a bypassing control or not, a special telephone number is used as a telephone number (ATM address) set as the calling party No. 318 or the called party No. 320 in the bypassing call setup message 302. For example, it is arranged that, when the bypassing call setup message 302 is received by the terminating ATM switch 100B and the routing table 150 is referred to, a retrieval error occurs.

Figure 9:
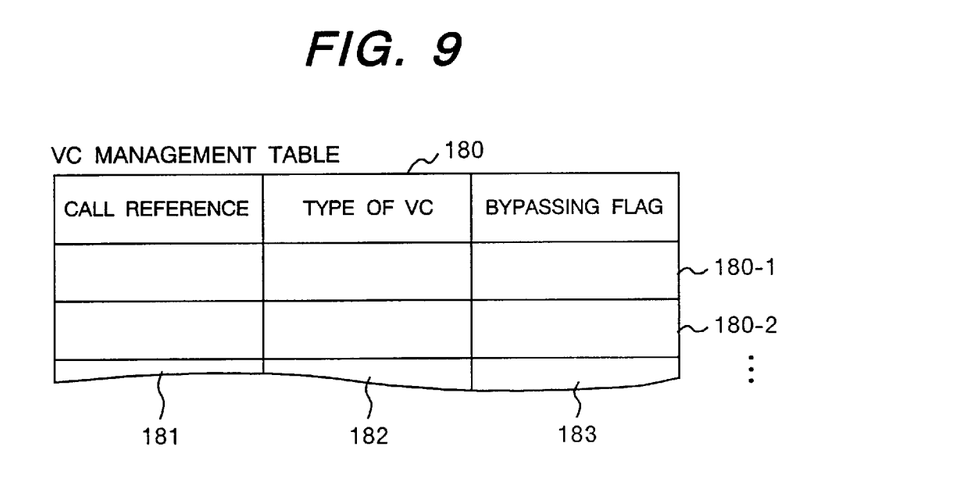
FIG. 9 is a diagram showing the configuration of a VC management table 180 prepared in each of the originating and terminating ATM switches.

FIG. 9 shows the configuration of the VC management table 180.

The VC management table 180 is composed of a plurality of entries 180-1, 180-2, . . . each storing a VC type 182 and a bypassing flag 183 in correspondence with a call reference 181. The VC type 182 indicates whether the VC having the call reference 181 is the PVC or SVC. The bypassing flag 183 indicates whether the SVC is for the PVC bypassing or not.

Figure 10:
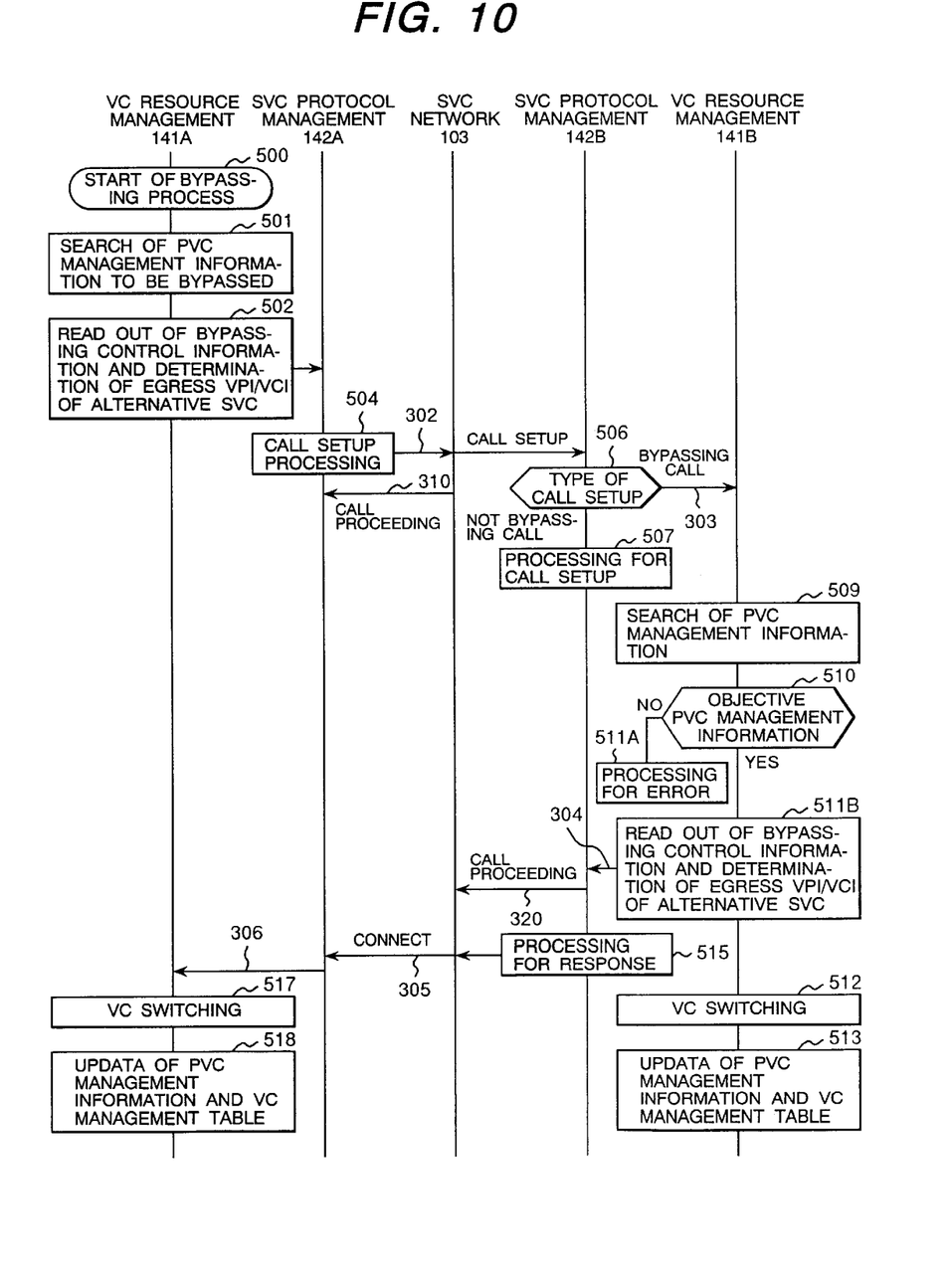
FIG. 10 is a diagram showing an embodiment of a sequence of switching a PVC to an SVC according to the invention, which is performed by the originating and terminating ATM switches.

FIG. 10 is an embodiment of a sequence of switching the PVC to the SVC according to the invention, performed between the originating ATM switch 100A and the terminating ATM switch 100B.

When the originating ATM switch 100A detects occurrence of a failure in the PVC physical line 201A, PVC logical line 202A, or PVC 203A or when a bypassing instruction, which designates the PVC physical line 201A, or the PVC physical line 201A and the logical line 202A, is received from the outside through manual operations, the call controller 40 starts a bypassing process 500 by the VC resource management 141A.

The VC resource management 141A refers to the PVC management information memory area 160 in the memory 15 on the basis of the line number of the PVC line to be bypassed, and retrieves the PVC management information block 160A-i corresponding to each of the PVCs multiplexed on the line to be bypassed (step 501). Subsequently, the bypassing control information block 170A-i is read out in accordance with the bypassing information pointer 206A of the retrieved PVC management information block 160A-i, the egress VPI/VCI 213A to be used by the alternative SVC is determined and, after that, the call request 301 is sent to the SVC protocol management 142A (step 502).

The call request 301 includes at least the SVC egress VPI/VCI 213A, and the SVC physical line No. 211A, called party ATM address 221A, information defining the PVC bypassed in the switch of the other party (the PVC physical line No. 201B, PVC logical line No. 202B, and PVC egress VPI/VCI 203B of the other party), and the originating ATM address 222A which shown in the bypassing control information block 170A-i.

The SVC protocol management 142A which has received the call request 301 generates the call setup message 302 by using the SVC egress VPI/VCI 213A as the connection discriminator 315, the originating ATM address 222A as the calling party No. 318, the called party ATM address 221A as the called party No. 321, and the PVC physical line No. 201B, PVC logical line No. 202B, and PVC egress VPI/VCI 203B of the other party as the peculiar information elements 322. The call setup message 302 is transmitted via the output line specified by the SVC physical line No. 211A to the SVC network 103.

When the call setup message 302 is received, the first node of the SVC network 103 returns a call processing message 310 to the SVC protocol management 142A as a sender and, after that, transfers the received call setup message 302 to the next node. In the ATM network, the value of the VPI/VCI for communication differs among nodes. Consequently, while the value of the connection identifier 315 is sequentially rewritten in the SVC network, the call setup message 302 reaches the terminating ATM switch 100B.

The call controller 40 in the terminating ATM switch 100B determines, when the call setup message 302 is received, whether the call setup message 302 is for a bypass call or not (step 506). The type of the call setup message 302 is determined by, for example, searching the routing table 150 on the basis of the called party No. 320. If an entry corresponding to the called party No. has been already registered in the routing table 150, it is determined that the received call setup message is not for a bypass call. When the corresponding entry has not been registered yet, it is determined that the received call setup message is for a bypass call.

When it is determined that the received call setup message is not for a bypass call, a regular processing for call setup (step 507) is executed, and the call processing message 320 is transmitted to the SVC network 103. When it is determined that the received message is a bypassing call setup message, on the basis of the bypassed PVC specifying information (201B, 202B and 203B) set as the peculiar information elements 322 in the received message, the corresponding PVC management information block 160B-j is retrieved from the PVC management information memory area 160 (step 509). When there is no corresponding PVC management information block 160B-j (step 510), a processing for an error (511A) is executed and a release complete message including the cause of the error is returned.

In the case where the PVC management information block 160B-j corresponding to the bypassing PVC specifying information (201B, 202B, and 203B) is retrieved, the bypassing control information block 170B-j is read out according to the bypassing information pointer 206B and, after that, the egress VPI/VCI 213B for the alternative SVC is determined (step 511B). By the operations, the SVC physical line No. 211B, the SVC logical line No. 212B, and the SVC egress VPI/VCI 213B which are necessary to rewrite the header conversion table by the terminating ATM switch 100B are specified.

The VC resource management 141B returns a reception response 304 to the SVC protocol management 142B and executes a VC switching process (step 512). The VC switching is achieved by replacing the table entry 110-m corresponding to the ingress VPI/VCI 200B of the PVC management information block 160B-j by an entry 120-m including the alternative SVC specifying information 211B, 212B, and 213B obtained in step 511B in the header conversion table of the input line interface indicated by the PVC ingress physical line No. 205B of the PVC management information block 160B-j.

The VC resource management 141B completes the operation of bypassing the PVC 203B by registering the call No. 311 of the call setup message 302 as the alternative SVC call No. 204B in the PVC management information block 160B-j and adding an entry 180-i having the call No. 311 into the VC management table 180 (step 513). In the entry 180-i in the VC management table 180, SVC is set in the VC type 182 and the flag "1" indicative of bypassing is set as the bypassing flag 183.

On receipt of the reception response 304 from the VC resource management 141B, the SVC protocol management 142B transmits a call processing message 320 to the SVC network 103 and, after that, sends a connection message 305 to the SVC network 103 (step 515). The connection message 305 includes: the same call reference 311 as that in the call setup message 302; the SVC egress VPI/VCI 213B notified by the reception response 304 as a connection identifier; and the PVC physical line No. 201A, PVC logical line No. 202A, and PVC egress VPI/VCI 203A of the other party which are notified by the reception response 304 as peculiar information elements.

In a manner similar to the call setup message 302, the connection message 305 is received by the originating ATM switch 100A while the value of the connection identifier is sequentially rewritten in the SVC network 103.

When the connection message 305 is received, the SVC protocol management 142A of the originating ATM switch 100A sends a response 306 to the VC resource management 141A. On receipt of the response 306, the VC resource management 141A executes the VC switching process (step 517).

In the VC switching process, in the line interface 11-1 indicated by the PVC ingress physical line No. 205A which has already been retrieved in step 501, it is sufficient to replace in the header conversion table, the entry 110-i corresponding to the ingress VPI/VCI 200A by a new entry 120-i including the alternative SVC specifying information. The new entry 120-i is generated from the SVC physical line No. 211A and the SVC logical line No. 212A indicated in the bypassing control information block 170A-i read out in step 502 and the SVC egress VPI/VCI 213A determined in step 502.

In a manner similar to the operation of the terminating VC resource management 141B in step 513, the VC resource management 141A registers the call reference of the connection message 306 as the alternative SVC call No. 204A in the PVC management information block 160A-i and adds an entry 180-i having the call reference to the VC management table 180 (step 518), thereby completing the bypassing operation with respect to the PVC 203A.

In the case where a plurality of PVCs are multiplexed on the physical line or logical line to be bypassed, the call setup messages 302 having different call Nos. with respect to a plurality of PVC management information blocks retrieved in step 501 are sequentially issued and the above-described control procedure is repeated every call. In this case, as described in the embodiment, by designating the PVC of the other party by each of the connection messages 305, the PVC can be switched to the SVC in a state where the PVC to be bypassed on the originating side and that on the terminating side coincide with each other. It is also possible to verify the PVC to be bypassed against the call number in place designating the PVC of the other party by the peculiar information elements.

Although the terminating ATM switch determines the type of the call setup on the basis of the called party No. in the received message (step 506) in the foregoing embodiment, the calling party No. may be used in place of the called party No. Alternately, the following manner is also possible. Special identification information indicating whether the call setup message is for a bypassing call or not is added into a specific field, for example, a peculiar information element field in the call setup message 302, and the SVC protocol management 142B on the terminating side determines the type of the call setup with reference to the identification information.

Although the PVC identifying information of the other party (201B to 203B) is set as the peculiar information elements 322 in the call setup message 302 in the foregoing embodiment, the PVC specifying information of the other party may be set in another field such as the calling party sub-address 319 or the called party sub-address 321 in the call setup message 302.

In FIG. 10, the VC resource management 141A on the originating side determines the SVC egress VPI/VCI in step 502 and, after that, sends the call request 301 to the SVC protocol management 142A. For example, the SVC egress VPI/VCI 213A may be determined by the VC resource management 141A in response to an inquiry from the SVC protocol management 142A which executes the call setup processing 504 in conformity with ITU-T Q.2931, or the VPI/VCI value to be used may be designated to the VC resource management 141A by the SVC protocol management 142A.

Figure 11:
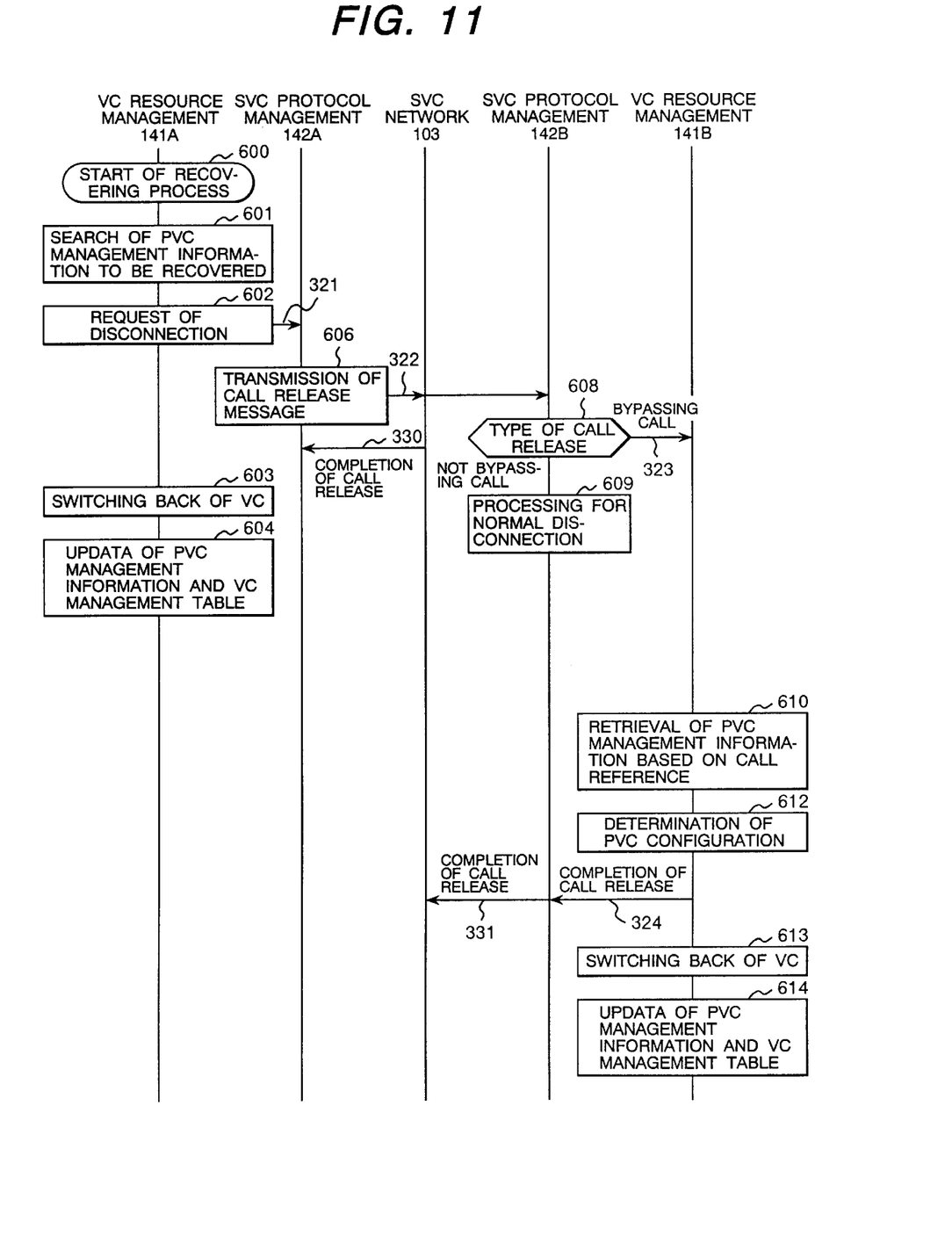
FIG. 11 is a diagram showing an embodiment of a sequence of switching the SVC back to the PVC according to the invention, which is performed by the originating and terminating ATM switches.

Referring now to FIG. 11, an operation of recovering from the SVC back to the PVC (switching back of VC) will now be described.

When it is detected that the failure has been fixed in the PVC line which is being bypassed or when a VC switching back instruction is received from the outside, the process of recovering the PVC is started by both or one of the ATM switches 100A and 100B positioning at both ends of the PVC. In the embodiment, a control sequence in the case where a PVC recovering process 600 is started by the originating ATM switch 100A and a call release message 322 is transmitted to the terminating ATM switch 100B will be described.

When the recovery from the failure in the PVC physical line 201A, PVC logical line 202A or PVC 203A is detected or when the switching back instruction is received from the outside, the call controller 40 in the originating ATM switch 100A retrieves the PVC management information block, for example 160A-i, corresponding to each of the PVCs multiplexed on the recovered line by the VC resource management 141A (step 601). Subsequently, the bypassing control information block 170A-i is read out on the basis of the bypassing information pointer 206A in the PVC management information block 160A-i, and a call release (or disconnection) request 321 is issued to the SVC protocol management 142A (step 602). The call release request 321 includes the SVC physical line 211A and the SVC logical line No. 212A indicated in the bypassing control information block 170A-i and the alternative SVC call No. 204A indicated in the PVC management information block 160A-i.

After issuing the call release request 321, the VC resource management 141A executes the process of switching the SVC back to the PVC (step 603), eliminating the alternative SVC call No. 204A from the PVC management information block 160A-i, and eliminating the entry corresponding to the alternative SVC call No. 204A from the VC management table 180 (step 604).

In the VC switching back process 603, in the header conversion table of the line interface specified by the PVC ingress physical line No. 205A in the PVC management information block 160A-i, the entry 120-i corresponding to the ingress VPI/VCI 200A is replaced by the original entry 110-i. In this case, the original entry 110-i is generated from the PVC egress physical line No. 201A, PVC egress logical line No. 202A, and PVC egress VPI/VCI 203A included in the PVC management information block 160A-i.

The SVC protocol management 142A which has received the call release request 321 generates a call release message 322 using the alternative SVC call No. 204A as a call No. and transmits 606 the call release message 322 to the SVC network 103. On receipt of the call release message 322, each of the nodes in the SVC network 103 returns a call release completion message 330 to the sender node and sequentially relays the release message to the next node.

When the terminating ATM switch 100B receives the call release message 323, the SVC protocol management 142B refers to the VC management table 180 on the basis of the call No. (alternative SVC call No. 204A) of the received message, and determines whether the call to be released is the bypassing call or not, based on the state of the bypassing flag 183 of the entry having the same call reference 181 (step 608). When the non-bypassing call is to be released, after executing a call releasing process (step 609), a call release completion message 331 is transmitted to the SVC network 103. When the call to be released is the bypassing call, a bypassing call releasing request 323 is issued to the VC resource management 141B.

The VC resource management 141B refers to the PVC management information memory area 160 on the basis of the call reference included in the bypassing call releasing request 323, retrieves the PVC management information block having the same alternative SVC call No. 204B, for example 160B-j (step 610), and specifies the physical line No. 201B, logical line No. 202B, egress VPI/VCI 203B, and ingress physical line No. 205B of the PVC to be recovered (step 612).

The VC resource management 141B notifies the SVC protocol management 142B of completion 324 of release of the bypassing call, executes the VC switching back process (step 613), eliminates the alternative SVC call No. 204B from the PVC management information block 160A-j, and eliminates the entry corresponding to the alternative SVC call No. 204B from the VC management table 180 (step 614).

In the VC switching back process 613, in a manner similar to the originating side, the entry 120-j corresponding to the ingress VPI/VCI 200B is replaced by the original entry 110-j in the header conversion table of the line interface specified by the PVC ingress physical line No. 205B in the PVC management information block 160A-j. In this case, the original entry 110-j can be generated from the PVC egress physical line No. 201B, the PVC egress logical line No. 202B, and the PVC egress VPI/VCI 203B included in the PVC management information block 160A-j.

Each of the originating and terminating ATM switches repeats the above-described processes on each of a plurality of PVCs multiplexed on the recovered line.

Although the VC management table 180 is updated by the VC resource management 141 in the foregoing embodiment, it can be also updated by the SVC protocol management 142. Although the type of call setup and call release is determined by the SVC protocol management 142 in the foregoing embodiment, it is also possible that the VC resource management 141 determines the type of the call setup and call release in response to a request from the SVC protocol management 142 and replies the result of determination to the SVC protocol management 142.

Although the relation between the PVC and the alternative SVC is shown in FIG. 6 with respect to one VC set between the ATM switches 100A and 100B, according to the invention, the plurality of PVCs multiplexed on the same physical or logical line are not always switched to the same SVC physical line or the same SVC logical line. When a PVC failure occurs, a part of the bandwidth is already being used by SVCs for conventional calls in the physical line of the SVC to be used as a bypass. Consequently, a bandwidth margin to provide bypass routes for all of failed PVCs is not always left on the same physical line. In order to certainly complete the bypassing operation, it is therefore desirable to form a plurality of bypass routes of the plurality of PVCs multiplexed on the same physical or logical line so as to be distributed on a plurality of physical lines. According to the embodiment of the invention, the alternative SVC is preliminarily defined in the bypassing control information block for each PVC. The multiplexing and distributing of the bypassing routes can be therefore controlled very easily.

According to the embodiment of the invention as shown in FIG. 7, the values of the alternative SVC call No. are registered in the data fields 204A and 204B of the PVC management information blocks 160A-j and 160B-j. However, these data fields may include the other reference information instead of the alternative SVC call No. if it is able to identify the reference information from the call No. of the call release message 322 or 323, and vice-versa.

As obviously understood from the above description, according to the invention, it is able to realize the switching from the PVC to the SVC and the switching from the SVC back to the PVC between the ATM switches located at both ends of the PVC by communicating the call setup message and the call release message.

According to the invention, each of the ATM switches located at both ends of a PVC prestores the relation between the SVC definition information of itself and the PVC definition information of the other party as bypassing control information in correspondence with the PVC definition information of itself. When the bypassing operation is started, one of the ATM switches transmits to the other ATM switch a bypassing call setup message including the PVC specifying information of the other party for each of the PVCs to be bypassed, so that the terminating ATM switch can specify the PVC to be bypassed from the reception message. Consequently, the two ATM switches can switch the PVC to the SVC in cooperation with each other.

What is claimed is:

1. A method of switching a virtual connection between first and second ATM switches in an ATM network, comprising the steps of:

previously storing into said first ATM switch, before a PVC between the first and second ATM switches is in a failure state, first bypassing control information in association with first PVC management information specifying the PVC, the first bypassing control information indicating first SVC specifying information for specifying an SVC to be used as a bypass of the PVC, address information of said second ATM switch, and second PVC specifying information necessary for said second ATM switch to specify the PVC;

previously storing into said second ATM switch before the PVC between the first and second ATM switches is in a failure state, second bypassing control information in association with second PVC management information specifying the PVC, the second bypassing control information indicating second SVC specifying information for specifying an SVC to be used as a bypass of the PVC, address information of said first ATM switch, and first PVC specifying information necessary for said first ATM switch to specify the PVC;

transmitting a bypassing call setup message autonomously from said first ATM switch to a line specified by the first SVC specifying information at the time of an operation of switching the PVC to the SVC, the bypassing call setup message including said second PVC specifying information and being transmitted using the address information of the second ATM switch as a called party address;

switching the PVC to the SVC by said first ATM switch on the basis of the first PVC management information and said first SVC specifying information when a response is received from said second ATM switch; and referring to the second bypassing control information corresponding to said second PVC specifying information extracted from the bypassing call setup message by said second ATM switch, thereby to switch a PVC specified by the second PVC specifying information to an SVC specified by the second SVC specifying information included as a part of the second bypassing control information.

2. A method of switching a virtual connection in an ATM communication network having a plurality of ATM switches, comprising the steps of:

previously storing into each of said plurality of ATM switches, bypassing control information in association with PVC management information for each of PVCs multiplexed on a physical or logical line, each of the bypassing control information indicating SVC specifying information for specifying an SVC to be used as a bypass of the PVC, address information of a counterpart ATM switch located at the other end of the PVC, and the other side PVC specifying information necessary for the counterpart ATM switch to specify the PVC to be bypassed;

transmitting when a bypassing factor occurs in a specific physical or logical line, a bypassing call setup message autonomously from one of said plurality of ATM switches which is using the physical or logical line, to a line specified by the stored SVC specifying information for each of the PVCs multiplexed on the physical or logical line, the bypassing call setup message including said the other side PVC specifying information and being transmitted using the address information of the counterpart ATM switch as a called party address;

switching the PVC to an SVC by said one of plurality of the ATM switches, on the basis of the stored PVC management information and said stored SVC specifying information when a response is received from said counterpart ATM switch; and referring, by said counterpart ATM switch, to bypassing control information corresponding to said the other side PVC information extracted from the received bypassing call setup message, thereby to switch a PVC specified by said the other side PVC specifying information to an SVC specified by the SVC specifying information included as a part of the referred bypassing control information.

3. An ATM switch having a function of switching a PVC to an SVC, comprising:

a memory for storing bypassing control information blocks in association with PVC management information blocks prepared for each of PVCs of the ATM switch, each of said PVC management information blocks indicating PVC specifying information for specifying one of said PVCs, and each of said bypassing control information blocks indicating SVC specifying information for specifying an SVC to be used as a bypass of corresponding one of said PVCs, address information of a counterpart ATM switch at the other end of the PVC, and the other side PVC specifying information necessary for the counterpart ATM switch to specify the PVC to be bypassed;

first means for transmitting when a bypassing factor of switching a specific PVC to an SVC occurs, a bypassing call setup message autonomously to a line specified by the SVC specifying information of one of said bypassing control information blocks which is in association with the PVC management information block corresponding to the specific PVC and switching the specific PVC to the SVC on the basis of the PVC specifying information and the SVC specifying information, the bypassing call setup message including the other side PVC specifying information indicated by the one of said bypassing control information blocks and being transmitted using the address information of the counterpart ATM switch as a called party address; and second means for referring when a bypassing call setup message is received from one of the other ATM switches, to the bypassing control information block corresponding to the other side PVC specifying information extracted from the bypassing call setup message and switching a PVC specified by said the other side PVC specifying information to an SVC specified by the SVC specifying information indicated by the bypassing control information block which is in association with the PVC management information block specified by said the other side PVC specifying information.

4. An ATM switch according to claim 3, wherein said first means comprises means for specifying a group of PVCs multiplexed on a specific physical or logical line to be bypassed by referring to the PVC management information blocks in said memory, thereby to transmit said bypassing call setup message to the counterpart ATM switch on the PVC and to switch the PVC to an SVC, for each of the PVCs.

5. An ATM switch according to claim 3, wherein said first means comprises means for storing a call reference given to the bypassing call setup message into the PVC management information block and means for transmitting a bypassing call release message having the call reference read out from the PVC management information block to the same line, to which the bypassing call setup message has been sent out, by using address information of the counterpart ATM switch as a called party address at the time of switching the SVC as a bypass back to the original PVC, and said second means comprises means for storing a call reference extracted from the bypassing call setup message received from said one of the other ATM switches into one of said PVC management information blocks corresponding to said the other side PVC specifying information extracted from the received bypassing call setup message and means for retrieving a PVC management information block having the call reference of the received bypassing call setup message and recovering when said bypassing call release message is received a PVC specified by said PVC specifying information indicated by the PVC management information block retrieved.

6. An ATM switch according to claim 4, wherein said first means comprises means for storing a call reference given to the bypassing call setup message into the PVC management information block and means for transmitting a bypassing call release message having the call reference read out from the PVC management information block to the same line, to which the bypassing call setup message has been sent out, by using address information of the counterpart ATM switch as a called party address at the time of switching the SVC as a bypass back to the original PVC, and said second means comprises means for storing a call reference extracted from the bypassing call setup message received from said one of the other ATM switches into one of said PVC management information blocks corresponding to said the other side PVC specifying information extracted from the received bypassing call setup message and means for retrieving a PVC management information block having the call reference of the received bypassing call setup message and recovering when said bypassing call release message is received a PVC specified by said PVC specifying information indicated by the PVC management information block retrieved.

7. An ATM switch according to claim 3, wherein said first means comprises means for storing reference information related to a call reference given to the bypassing call setup message into the PVC management information block and means for transmitting a bypassing call release message having the call reference to the same line, to which the bypassing call setup message has been sent out, by using address information of the ATM counterpart ATM switch as a called party address at the time of switching the SVC as a bypass back to the original PVC, and said second means comprises means for storing reference information specified from to the call reference extracted from the bypassing call setup message received from said one of the other ATM switches into one of said PVC management information blocks corresponding to said the other side PVC specifying information extracted from the received bypassing call setup message and means for retrieving when said bypassing call release message is received a PVC management information block having the reference information corresponding to the call reference of the received message and recovering a PVC specified by said PVC specifying information indicated by the PVC management information block retrieved.

8. An ATM switch according to claim 4, wherein said first means comprises means for storing reference information related to a call reference given to the bypassing call setup message into the PVC management information block and means for transmitting a bypassing call release message having the call reference to the same line, to which the bypassing call setup message has been sent out, by using address information of the ATM counterpart ATM switch as a called party address at the time of switching the SVC as a bypass back to the original PVC, and said second means comprises means for storing reference information specified from to the call reference extracted from the bypassing call setup message received from said one of the other ATM switches into one of said PVC management information blocks corresponding to said the other side PVC specifying information extracted from the received bypassing call setup message and means for retrieving when said bypassing call release message is received from a PVC management information block having the reference information corresponding to the call reference of the received message and recovering a PVC specified by said PVC specifying information indicated by the PVC management information block retrieved.

* * * * *